United States Patent Office 3,506,342
Patented Apr. 14, 1970

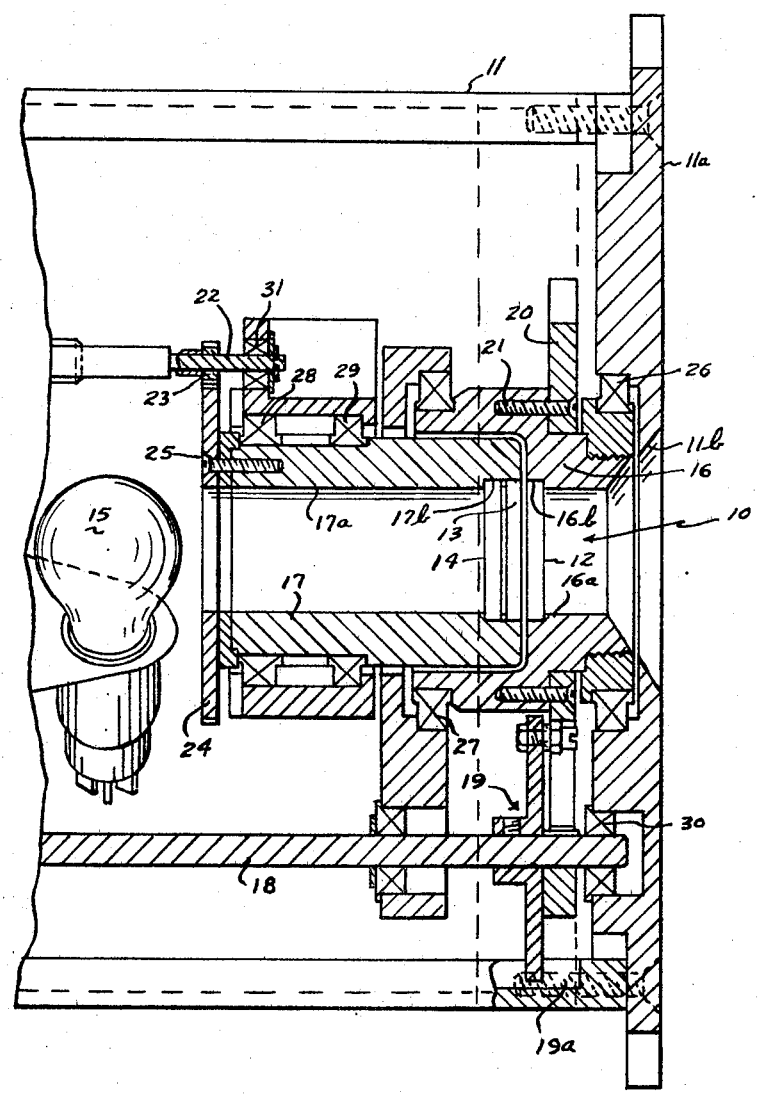

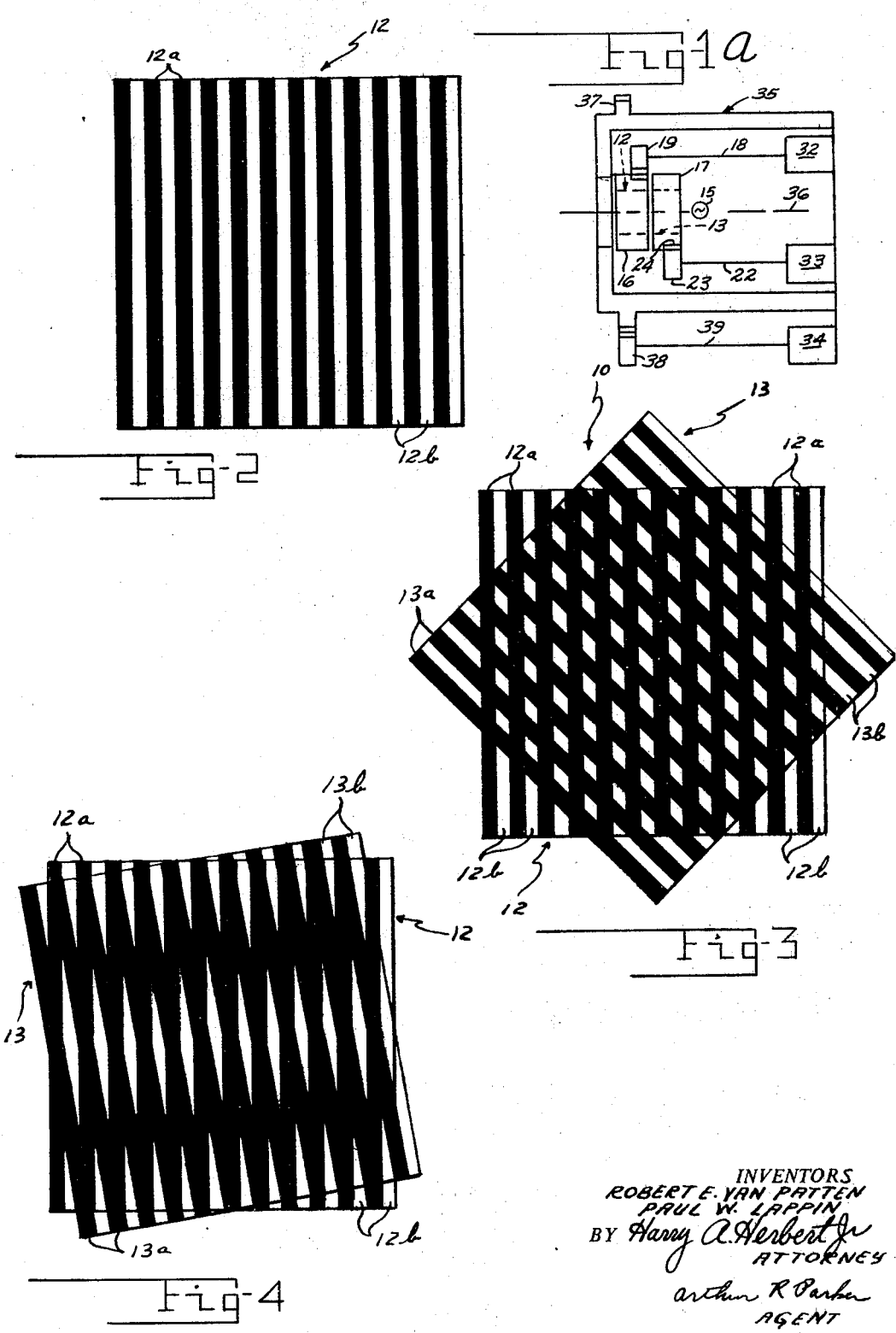

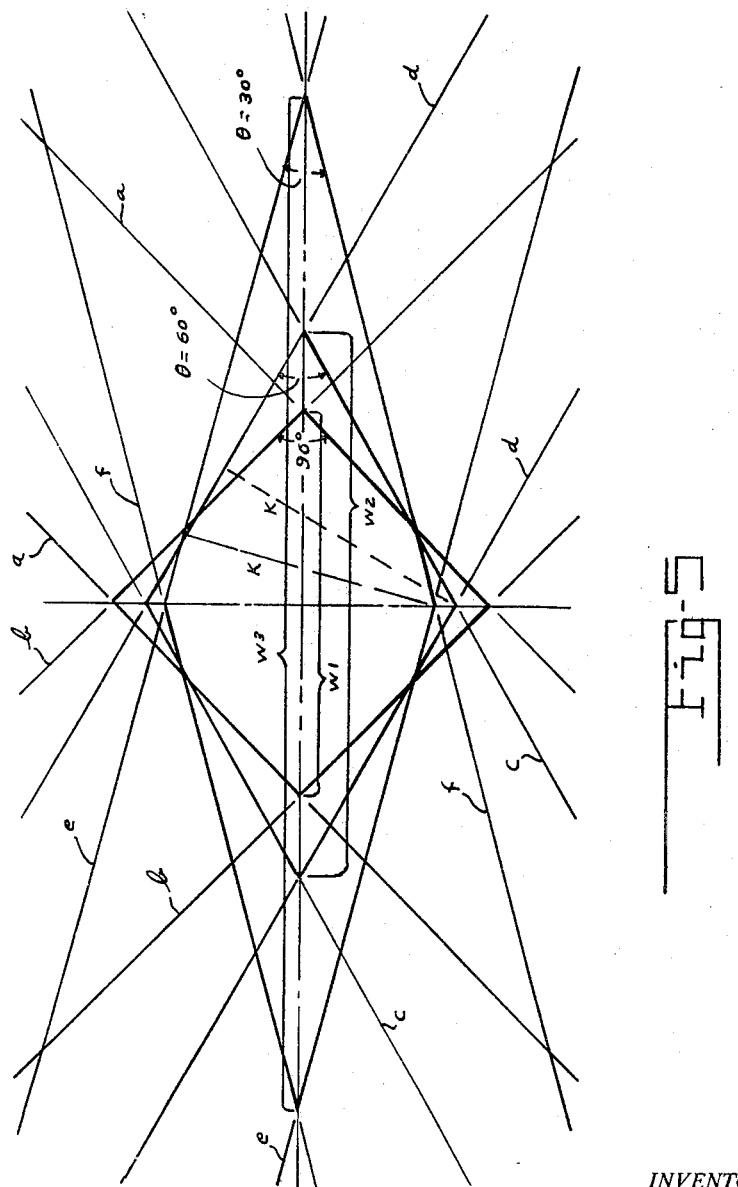

3,506,342
INSTRUMENT FOR THE MEASUREMENT OF VISUAL ACUITY AND THE ASTIGMATIC AXIS
Robert E. Van Patten and Paul W. Lappin, Dayton, Ohio, assignors to the United States of America as represented by the Secretary of the Air Force
Filed Oct. 5, 1967, Ser. No. 673,230
Int. Cl. A61b 3/02
U.S. Cl. 351—34     4 Claims

ABSTRACT OF THE DISCLOSURE

A pair of transparent optical glass elements inscribed with a series of spaced-apart, parallel opaque lines, and adjustable both in rotation relative to each other to a first, relative angular position therebetween representing a measure of the viewer's visual acuity, and being further adjustable together to a second, common angular position about a central axis and representing a measure of the viewer's astigmatic axis.

BACKGROUND OF THE INVENTION

The present invention relates generally to the field of visual acuity and astigmatic axis measuring means. In previously developed methods, visual acuity has been measured with the use of eye charts alone, or in combination with certain clinical instruments equipped with various projection systems. The latter have the built-in disadvantage of being severely limited in range because of the necessity of maintaining a sharp focus. Moreover, the use of eye charts has involved the problems of different letter readability at the same visual angle, and the possibility of response bias to certain letters, or to different configurations of the same letter. The need for a purely optical system, without the use of eye charts and/or projection systems became readily apparent in order to improve eye testing procedures, and the present invention exploits the obvious advantages of such a system in a novel and improved manner, as will hereinafter become obvious from the following disclosure.

SUMMARY OF THE INVENTION

The principal object of the present invention, therefore, is in the provision of a new and improved visual acuity and astigmatic axis-measuring instrument with a novel and simplified optical system having separately mounted transparent optical glass elements ruled with opaque lines and angularly adjustable relative to each other to thereby display a composite pattern of parallel lines and spaces of changing configuration varying from a sharply defined and focused configuration to a prescribed configuration barely discernible to the viewer and representing the measure of his visual acuity.

Another object of the invention is in the utilization in a refractive error-type measurement instrument of an improved optical system including a backlighted display formed from a double element optical glass arrangement with each element thereof lined with a series of opaque lines and having equal width transparent spaces, and further being separately adjustable to a certain angular displacement therebetween at which the display formed thereby is barely visible to the viewer and constitutes a measurement of his visual acuity, and further adjustable together as a unit to a composite angular position at which the barely visible display is no longer discernible to the viewer afflicted with astigmatism and represents a measure of the astigmatic axis.

Other objects and advantages of the invention will become apparent from the following summary and detailed description, taken in connection with the accompanying drawings, in which:

SUMMARY OF THE DRAWINGS

FIGURE 1 is a longitudinal sectional view, partly broken away, showing the improved and simplified optical system of the present invention mounted in the front portion of a visual acuity measuring instrument, and illustrating the double grating element arrangement utilized therewith;

FIGURE 1a represents a schematic view of the principal portions of the optical system of FIGURE 1 shown rigidly mounted in a housing structure which may be rotated about a common axis to thereby provide for the astigmatic-measuring operation of the present invention;

FIGURE 2 is a greatly enlarged front view of the basic transparent optical element utilized with the double grating element arrangement depicted in FIGURE 1, and illustrating the pattern of inscribed opaque lines and spaces formed thereon and used in the novel optical system of the present invention.

FIGURE 3 is another greatly enlarged view, somewhat similar to that of FIGURE 2, but showing the individual front and rear grating elements of the double grating element arrangement of FIGURE 1 both inscribed with parallel opaque lines and in superimposed relation and further demonstrating the basic diamond pattern displayed when the two elements are backlighted and rotated at an approximately 45° angle to each other.

FIGURE 4 is another greatly enlarged front view of the double grating element arrangement of the present invention, illustrating the change in the composite pattern displayed thereby from that of the diamond pattern of FIGURE 3 to that of parallel bands of light and dark, when the angular relation between the superimposed double element arrangement of the present optical system is changed from 45° to approximately 10°; and FIGURE 5 is a greatly enlarged diagrammatic view, illustrating examples of significant increases in the size of the diamond pattern displayed from the backlighted double element configuration of the present invention, as the included angle between the individual rotatable elements thereof is decreased from 90°.

DESCRIPTION OF THE PREFERRED EMBODIMENT

With reference to the drawing and, in particular, to FIGURE 1, the improved and simplified optical system of the present invention is indicated generally at 10 as being mounted within the casing or frame of an optical measurement instrument, the front portion of which is indicated in broken away manner by the reference numeral 11. The present optical system generally includes a double grating element arrangement consisting of a front optical transparent glass grating element at 12 and an identical rear transparent grating element at 13, an opal glass diffuser element at 14 for ensuring the application of even illumination on the rear of the aforesaid double grating element arrangement, and a light source at 15 for providing a backlighted display during operation of the present system. It is noted that, although the present invention is described with reference to its being housed within an optical instrument of a particular design, this is only for the purpose of illustrating the operation of the inventive optical system. The latter is of more general utility and may naturally be contained within housings of various designs and operated by any appropriately designed drive mechanism to implement the intended eye testing functions without departing from the true spirit or scope of the invention.

Referring again to FIGURE 1, the instrument casing or frame 11 in which the present optical system may be positioned is shown as incorporating a rotatably mounted front support member at 16 that is designed to provide a centrally disposed light passage at 16a having a circumferential slot at 16b in which is rigidly positioned the front grating element 12. A rotatably mounted rear support member at 17 is also positioned in said instrument frame 11 in contiguous relation to, and axially aligned with, said front support member 16, and it is likewise designed to provide a centrally disposed light passage at 17a that has a circumferential slot at 17b in which is rigidly positioned in similar manner the rear grating element 13. In view of the contiguous relationship made between front and rear support members 16 and 17, light passages 16a and 17a actually combine to form a unitary and continuous light passage extending from a rearmost position just in front of the previously noted light source 15 to a front observation opening indicated at 11b as being integrally formed in a front piece element 11a that is attached to, and may form a part of, the instrument casing or frame 11.

Both of the aforesaid front and rear support members 16 and 17 are rotatably mounted to the frame 11, either directly or indirectly, by means of the bearings indicated respectively at 26 and 27, and at 28 and 29. The drive means for the front support member 16 may consist in one form of a Geneva mechanism drive motor 32 (see FIGURE 1a), a drive shaft, shown in broken away manner at 18 (FIGURE 7), and a Geneva mechanism, and pin indicated generally at 19 and 19a, respectively, as being mounted on the drive shaft 18 near the end thereof. One end of said shaft 18 is shown rotatably mounted to the instrument frame-front piece element 11a by the bearing 30. Geneva mechanism 19 drives a driven gear wheel 20 that is fastened to the front support member 16, as by means of the fasteners at 21. With the use of Geneva mechanism 19 and pin 19a, the front support member 16 and the front grating element 12 rigidly positioned therein can be oriented to any one of four or more cardinal points, as considered appropriate in preparing the present invention for testing the eyes of a subject.

The drive means for the rear support member 17 may likewise consist of a gear drive motor 33 (note FIGURE 1a), a drive shaft 22 incorporating a reduced diameter end portion that carries a pinion gear 23, and a driven gear wheel 24 meshing with and being driven by the pinion gear 23 and attached to the end of the rear support member 17 by means of appropriate fasteners 25. The end of said shaft 22 is illustrated rotatably positioned on an instrument frame support element by means of the bearing 31. In this manner, rear support member 17 and the rear grating element 13 carried therein may be rotated to any desired angle relative to the front grating element 12 for a purpose to be hereinafter described in detail.

Referring specifically to FIGURE 2 of the drawing, the basic transparent optical glass element of the present invention is represented by the previously noted front grating element 12. In accordance with the teaching of the present invention, a series of parallel lines, made opaque to the transmission of light, are inscribed upon the surface of transparent element 12, as is indicated at 12a. These opaque lines 12a are made equal in width to the alternately disposed transparent spaces remaining therebetween, which are indicated at 12b. A second transparent optical glass element, as represented by the previously noted rear grating element 13, is positioned in spaced relation to, and immediately behind the front grating element 12, as has been illustrated in FIGURE 1. Rear transparent element 13 is also inscribed with a series of parallel opaque lines, indicated at 13a in FIGURE 3, to likewise provide a pattern of parallel lines and spaces, the latter being indicated at 13b. Both lines 13a and spaces 13b are equal in width to each other and to the lines 12a and spaces 12b of front grating element 12 and, therefore, the pattern formed on both grating elements 12, 13 are identical to each other. Said rear grating element 13 is shown rotated relative to the front grating element 12, in the view of FIGURE 3, through an included angle of approximately 45° between the parallel lines respectively inscribed on grating elements 12, 13. In this connection, it is noted that when the number of lines inscribed is 200/inch, giving a line width of $\frac{1}{400}$ of an inch, and the included angle is 90°, a composite pattern of perfect squares is actually displayed when the source of light 15 (note FIGURE 1) is activated. When this angle is decreased from 90°, microscopic examination reveals that a pattern of diamonds is formed, as is seen for the 45° included angle display of FIGURE 3. However, the human eye has ben found incapable of resolving this diamond pattern, but it is capable of resolving the pattern of parallel lines and spaces depicted, for example, in FIGURE 4, which represents the composite display formed when the respective lines inscribed on front and rear grating elements 12, 13 are rotated at about a 10° angle relative to each other.

In addition to the above noted characteristics of the human eye making it incapable of resolving a diamond pattern, but capable of resolving a series of parallel lines and spaces, another unique phenomenon of the human eye has likewise been noted and is utilized with the present invention, as will be described in detail hereinafter. The phenomenon referred to above is the eye feature that results in an apparent pattern of lines and spaces that appear to the viewer to widen as the included angle, as at $\theta$ in FIGURE 5, between the lines approaches 0° and to narrow as the included angle increases. With a 200 line/inch configuration, the apparent display finally becomes a diffuse field to the unaided eye when the included angle, $\theta$, is increased beyond about 20°.

Microscopic examination also reveals that, when the included angle between the lines formed on front and rear grating elements 12, 13 is decreased from 90°, the long diagonal of the composite diamond pattern formed therebetween increases rapidly, as the angle between the lines decreases. Thus, as seen in FIGURE 5, for example, when the aforesaid included angle between the lines indicated at $a$ and $b$ is 90° and therefore forms a square pattern, the previously noted diagonal is equal to one length, shown represented by the letter, $W^1$. Now, when this included angle is decreased to 60°, for example, as formed by the lines denoted at $c$ and $d$ in FIGURE 5, the long diagonal of the diamond pattern formed is of a significantly greater length that is denoted by the letter, $W^2$. The latter has clearly increased to a significantly greater length than that of $W^1$. Finally, when the included angle is even further decreased to 30°, as formed by the lines indicated at $e$ and $f$, the dimension of the long diagonal thereof has rapidly increased to a length denoted by the letter, $W^3$.

It thus becomes readily apparent, from an examination of the sketch of FIGURE 5, that a simple mathematical expression may be determined relating the long diagonal of the diamond pattern formed by relative rotation between the front and rear grating elements 12, 13 of the present invention to the width of the space between the lines and, therefore, the width of the lines themselves, and to the included angle, $\theta$, between the lines. With use of this mathematical expression, to be derived hereinafter, the visual acuity of the viewer may be relatively easily computed from the present width of the lines being utilized, and the included angle, $\theta$, at which the parallel lines and spaces are just visible to the viewer.

Therefore, with specific reference to FIGURE 5:

Let: K = the ruling width (space);
W = the length of the long diagonal of the diamond pattern (where $w = W/2$ in the following expression);
$\theta$ = the included angle between the lines; and, S = the length of one side of the diamond;

then:

(see FIGURE 5);

$$K/S = \sine \theta, \quad S = K/\sine \theta$$

$$w/s = w \sine \theta / K = \sine (90° - \theta)$$

$$w = K \sine (90° - \theta)/\sine \theta = K \cos \theta / \sine \theta = K/\tan \theta,$$

and therefore:

$$W = 2K/\tan \theta$$

In actual operation, front and rear grating elements 12 and 13 are opposed face-to-face and backlighted. The subject whose eyes are to be tested may be positioned at any location in front of the front observation opening 11b (note FIGURE 1) from a range of a few inches away to virtually any distance. Front grating element 12 may then be oriented to any one of four or more cardinal points through operation of the Geneva mechanism 19, and then, rear grating element 13 is independently rotated, by operation of its drive mechanism (see FIGURES 1 and 1a), to some angle of rotation relative to front grating element 12 to thereby generate the previously described pattern of diamonds. As the included angle between the opaque lines 12a and 13a, respectively inscribed on front and rear grating elements 12 and 13 is further decreased to about 18°, the eye of the subject being tested actually resolves the diamond pattern into a series of parallel opaque lines and spaces of equal width which, as the included angle decreases further, become steadily wider while maintaining equality of line and space width. When the subject views this display from some given range, the angle between the grating elements 12, 13 at which the subject can just distinguish a line/space pattern becomes an accurate measure of his visual acuity when used with the previously described mathematical expression relating the long diagonal of the diamond pattern, $w$, to the line width, $K$, and the included angle, $\theta$.

The astigmatic axis of a subject afflicted with astigmatism may also be accurately measured by holding both elements 12, 13 in the fixed position relative to each other which was previously utilized to determine his visual acuity in the unique manner hereinbefore described. For this purpose, any suitable mechanism, as for example that depicted in the schematic view of FIGURE 1a, may be used for rotating said elements together as a composite unit, to some common angle of rotation at which the previously visible pattern of lines and spaces that were a measure of visual acuity is no longer discernible. The angle corresponding thereto then defines the astigmatic axis of the eye being examined. To this end, the entire assembly of the present invention comprising the front and rear grating elements 12 and 13, and the support members 16 and 17 provided therefor, the drive motor 32 and associated drive shaft and Geneva mechanism 18 and 19, as well as the gear drive motor 33, and associated drive shaft 22 and pinion gear 23, may be positioned in affixed manner within the grating assembly, or enveloping housing, shown generally at 35 in the previously-mentioned FIGURE 1a. Enveloping housing 35 may be preferably mounted to the previously-described instrument frame 11 in any desired manner for rotation about a shaft axis, the centerline of which is indicated at the reference numeral 36. In addition, the housing 35 may further incorporate a relatively enlarged driven gear wheel, illustrated schematically at 37, which gear wheel 37 may be affixed on, or near the end of said housing 35 in a manner similar to that described for the attachment of the previously-described driven gear wheel 24 for the rear support member 17 (FIGURE 1). A gear drive motor for driving the enveloping housing 35 is indicated at 34 as including a drive shaft 39, and a pinion gear 38 mounted adjacent to the end of said drive shaft 39. Said pinion gear 38 meshes with, and, on operation of said drive motor 34, rotates the entire grating assembly, or enveloping housing 35, and therefore the combined front and rear grating elements 12, 13 to the aforementioned common angle at which the previously-referred to visible pattern between the opaque lines and transparent spaces formed on each of said elements becomes indistinguishable and thereby provides a measure of the astigmatic error, if any, of the patient.

Although the improved optical system of the present invention was designed for and is especially adapted to use in the measurement of visual acuity generally in confined spaces and, in particularly, to measurements, for example, in the gondola of a centrifuge device to study human tolerance to present and future manned aerospace weapons systems, it is equally utilizable as a device of more general utility and application in the measurement of visual acuity and the astigmatic axis at any range in either the near or far field.

We claim:

1. Apparatus for testing visual acuity and the astigmatic axis of a subject afflicted with astigmatism, comprising; an instrument housing having a front observation opening, a light source and a light passage extending therebetween; an optical system positioned in the light passage between the light source and the front opening and having a first, light-transmitting means incorporating a double pattern, each comprising a single set of identical and parallel opaque lines and transparent spaces of equal width thereto and alternately arranged therewith, each set of lines and spaces being incorporated on adjacently-positioned separate mounting and adjusting means, and thereby initially adjusted to a clearly discernible position to the subject and further angularly adjustable both with relation to each other to thereby measure visual acuity and together as a composite unit about a central axis to thereby measure the subject's astigmatic axis and thus transmit a variable backlighted display from the light source to the front observation opening for viewing by the subject whose eyes are to be tested; second, combined actuating and supporting means for separately supporting and adjusting each of said separate mounting and adjusting means incorporated in said first, light-transmitting means and the relative angular position between the respective patterns collectively formed thereon between said sets of parallel opaque lines and transparent spaces from a first position of adjustment therebetween displaying a relatively wide configuration appearing clearly visible to the subject, to a second position of adjustment displaying a relatively narrow configuration just discernible to the subject and constituting the measure of his visual acuity; and common drive means operably engaged with, and actuating both of said separate mounting and adjusting means about said central axis through the same common angles of adjustment until the barely discernible pattern previously formed by the relative adjustment between said sets of opaque lines and transparent spaces and representing the measure of visual acuity is no longer visible, and thereby constitutes a measure of the astigmatic error, if any, of the subject being tested.

2. Apparatus as in claim 1, wherein said separate mounting and adjusting means comprises opposed optical glass elements each being separately inscribed with one of said sets of opaque lines, and said second, combined-actuating and supporting means comprises at least one main support member rotatably positioned in the instrument housing and containing at least one of said opposed elements rigidly positioned therewithin, and further forming an axially-aligned light passage therethrough; driven gear means attached to said support member; and motor-driven shaft and drive gear means engaging and adapted to continuously drive said drive gear means and main support member and the light-transmitting, partly-opaque opposed element positioned therewithin to various angular positions relative to the other of said opposed elements to thereby display a composite pattern of a continuously-changing and reduction-in-size configuration formed from, and between said sets of parallel opaque lines and transparent spaces and thus determine the specific angular relation that produces the minimum sized dark and light pattern configuration of lines and transparent spaces just visible to the subject and being the measure of his visual acuity.

3. Apparatus as in claim 1, wherein said first, light-transmitting means comprises a pair of separately-mounted and opposed, transparent optical glass elements respectively incorporating an identical pattern of light and dark fringes formed on the faces thereof from said series of parallel and transparent spaces inscribed on each of said elements, and said second, combined supporting and adjusting means comprises a separate drive mechanism for independently and selectively rotating each of said opposed elements and thereby orienting the respective patterns formed thereon by its respective series of parallel opaque lines and transparent spaces to increasingly-larger included angles therebetween for forming a series of backlighted displays, when exposed to said light source, of changing configurations and increasingly-reduced sizes that become less and less visible until the relative angle of rotation between the respective series of parallel opaque lines and transparent spaces forming said patterns reaches the maximum angle compatible with the minimum size pattern that the subject is just capable of distinguishing and from which angle his visual acuity may be determined.

4. Apparatus as in claim 3, said pair of opposed transparent elements being further mounted for subsequent rotation together about a common axis to a composite angle at which the barely distinguishable pattern of dark and light previously formed between said series of parallel opaque lines and transparent spaces and determined from the relative rotation between said elements is not longer visible to a subject afflicted with astigmatism and constitutes the measure of his astigmatic axis.

References Cited
UNITED STATES PATENTS 1,270,830   7/1918   Ives _____ 351—1

DAVID SCHONBERG, Primary Examiner

P. A. SACHER, Assistant Examiner

U.S. Cl. X.R.

351—36